United States Patent [19]
Vafai et al.

[11] Patent Number: 5,706,220
[45] Date of Patent: Jan. 6, 1998

[54] SYSTEM AND METHOD FOR IMPLEMENTING THE FAST WAVELET TRANSFORM

[75] Inventors: Manoucher Vafai, Los Gatos; Loganath Ramachandran, San Jose; Mody Lempel, Sunnyvale, all of Calif.

[73] Assignee: LSI Logic Corporation, Milpitas, Calif.

[21] Appl. No.: 645,575

[22] Filed: May 14, 1996

[51] Int. Cl.$^6$ ............................................. G06F 17/10
[52] U.S. Cl. ............................ 364/724.05; 364/724.13
[58] Field of Search .................... 364/724.05, 724.13; 382/240, 276, 248, 260; 348/398

[56] References Cited

U.S. PATENT DOCUMENTS

| | | | |
|---|---|---|---|
| 4,682,301 | 7/1987 | Horiba et al. | 364/724.05 |
| 5,101,446 | 3/1992 | Resnikoff et al. | 382/248 |
| 5,276,525 | 1/1994 | Gharavi | 348/398 |
| 5,382,979 | 1/1995 | Mun | 348/398 |
| 5,384,869 | 1/1995 | Wilkinson et al. | 382/240 |
| 5,563,960 | 10/1996 | Shapiro | 382/240 |

FOREIGN PATENT DOCUMENTS 3305640  8/1984  Germany.

OTHER PUBLICATIONS

Hilton, Michael L., et al, *Compressing Still and Moving Images with Wavelets*, Multimedia Systems, Apr. 18, 1994, vol. 2, No. 3, pp. 1–17.

Gray, Robert M., *Vector Quantization*, IEEE ASSP Magazine, Apr. 1984, pp. 4–29, U.S.A.

*Primary Examiner*—Tan V. Mai
*Attorney, Agent, or Firm*—Fenwick & West LLP

[57] ABSTRACT

A system and method implementing a fast wavelet transform by shifting a pair of pixels into a single shift register and using a multimode quadrature mirror filter to eliminate the need of downsampling the filtered signals and to decrease the area required to implement the device on a semiconductor chip.

8 Claims, 21 Drawing Sheets

TRANSFORM METHOD

TRANSFORM METHOD

CONVENTIONAL FILTER FOR INVERSE WAVELET FILTERING

HIGH-THROUGHPUT FILTER FOR INVERSE WAVELET FILTERING 1100

CONVENTIONAL FILTERING METHOD FOR INVERSE WAVELET FILTERING

HIGH-THROUGHPUT FILTERING METHOD FOR INVERSE WAVELET FILTERING

LOW-THROUGHPUT FILTERING METHOD FOR INVERSE WAVELET FILTERING

1602 $\longrightarrow$ (i,0), (i,1), (i,2), ..., (i,J−3), (i,J−2), (i,J−1)

cyclical row i

1604 $\longrightarrow$ (0,j), (1,j), (2,j), ..., (I−3,j), (I−2,j), (I−1,j)

cyclical column j

CYCLICAL ROWS AND COLUMNS
FIGURE 16

TWO-DIMENSIONAL MATRIX AS ONE-DIMENSIONAL ARRAY
(RASTER SCAN ORDER)

TWO-DIMENSIONAL MATRIX AS ONE-DIMENSIONAL ARRAY
(ZIG-ZAG ORDER)

SYSTEM AND METHOD FOR IMPLEMENTING THE FAST WAVELET TRANSFORM

FIELD OF THE INVENTION

The present invention relates generally to multimedia computing and communication. More particularly, the invention relates to a system and method for implementing the fast wavelet transform for the digital compression of still images and video signals.

BACKGROUND OF THE INVENTION

Recently, there has been growing demand for multimedia computing and communication. This growing demand has motivated searches for better bandwidth management techniques, including newer and more efficient compression methods.

Today's mainstream compression methods, such as JPEG for still images and MPEG for video, use the Discrete Cosine Transform (DCT). The sinusoidal basis functions of the DCT have infinite support and so each sinusoidal basis function provides perfect frequency resolution but no spatial resolution. At the other extreme, impulse basis functions have infinitesimal support, so each impulse basis function provides perfect spatial resolution but no frequency resolution. However, neither sinusoidal nor impulse basis functions are very well suited for the purposes of image and video compression. Better suited are basis functions which can trade-off between frequency and spatial resolution.

The wavelet basis functions of a wavelet transform are such basis functions in that each wavelet basis function has finite support of a different width. The wider wavelets examine larger regions of the signal and resolve low frequency details accurately, while the narrower wavelets examine a small region of the signal and resolve spatial details accurately. Wavelet-based compression has the potential for better compression ratios and less complexity than sinusoidal-based compression. The potential for wavelet-based compression is illustrated by FIGS. 19, 20, and 21. FIG. 19 is an original 8 bits per pixel 512×512 image of "Lena." FIG. 20 is a reconstructed image of Lena after JPEG compression at a compression ratio of approximately 40. FIG. 21 is a reconstructed image of Lena after wavelet compression at a compression ratio of approximately 40 using a preferred embodiment of the present invention. FIG. 21 appears less "blocky" than FIG. 20 because of the varying widths of the wavelet basis functions. For a practical discussion of wavelet-based compression, see, for example, "Compressing Still and Moving Images with Wavelets," by Michael, L. Hilton, Bjorn D. Jawerth, and Ayan Sengupta, in *Multimedia Systems*, volume 2, number 3 (1994). Another useful article is "Vector Quantization," by Robert M. Gray, in *IEEE ASSP Magazine*, Apr. 1984. Both the above articles are herein incorporated by reference in their entirety.

Prior systems and methods for wavelet filtering shift the individual pixels into two shift registers, then pass the pixels in each set through a filter and a downsampler. These prior systems and methods do not efficiently compute the fast wavelet transform of an image.

SUMMARY OF THE INVENTION

The system and method of the present invention provides an implementation of the fast wavelet transform for use in an image compression system. Pairs of pixels are shifted into a single shift register and a multimode high-pass/low-pass filter is used, eliminating the need for downsampling and decreasing the area required to implement the device on a semiconductor chip.

BRIEF DESCRIPTION OF THE DRAWINGS

FIG. 16 is a diagram illustrating cyclical boundary conditions for a general row i and for a general column j.

DESCRIPTION OF THE PREFERRED EMBODIMENT

The preferred embodiment of the present invention is now described with reference to the figures where like reference numbers indicate identical or functionally similar elements. Also in the figures, the most significant digit(s) of each reference number corresponds to the figure in which the reference number is first used.

Figure 1:
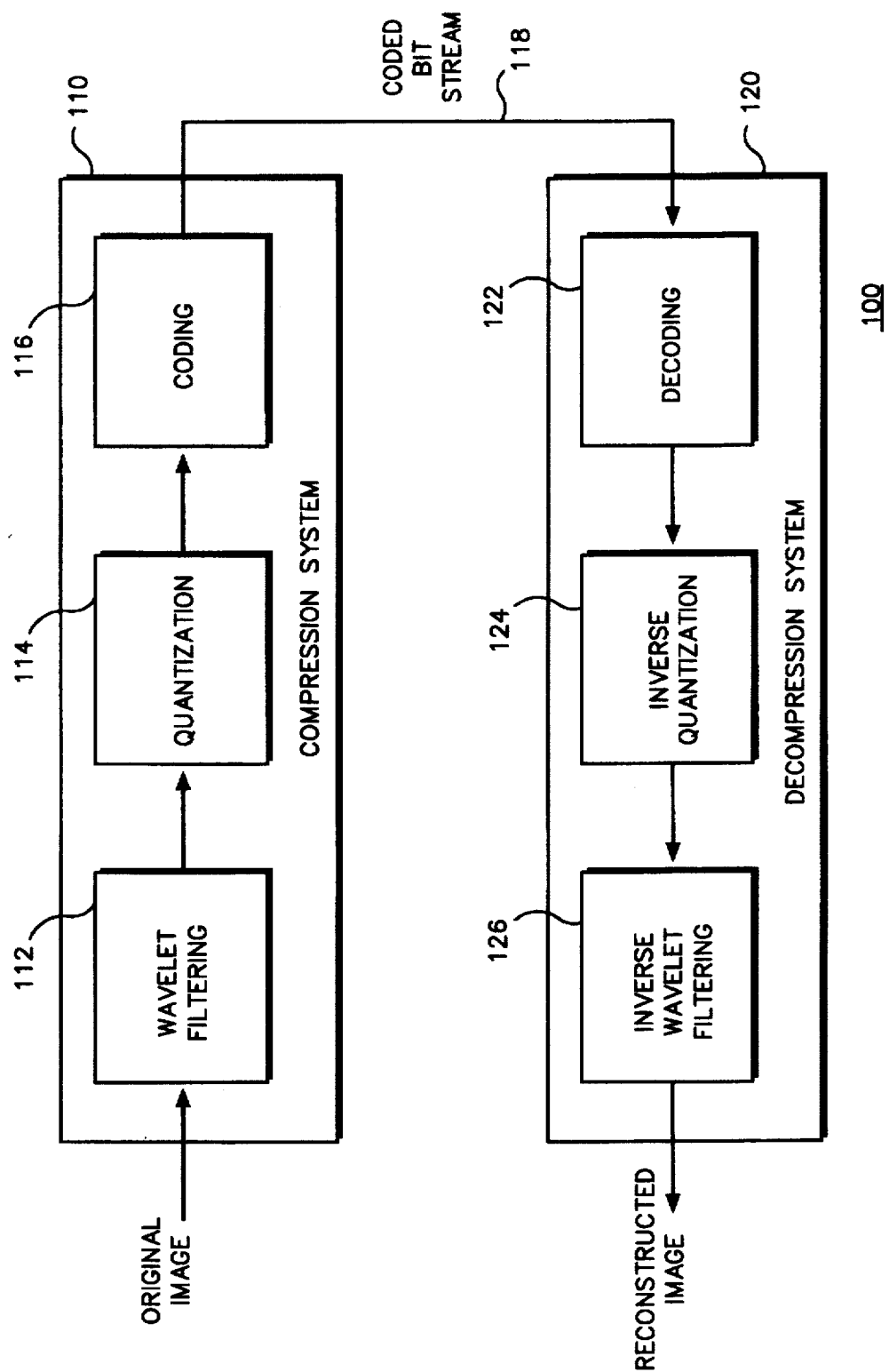
FIG. 1 is a block diagram illustrating a wavelet-based image compression and decompression system including a preferred embodiment of the present invention.

FIG. 1 is a block diagram illustrating a wavelet-based image compression and decompression system including a preferred embodiment of the present invention. As shown in FIG. 1, a wavelet-based image compression system 110 generally has three main components: a wavelet filtering device 112 to derive select subimages from the image, a quantization device 114 to quantize the resulting transform coefficients, and a coding device 116 to encode the quantized values into a coded bit stream 118 which is transmitted over a network. Quantization is discussed in the article "Vector Quantization" referenced above. A common encoding scheme is conventional Huffman encoding.

Image reconstruction by a decompression system 120 is accomplished by inverting the compression operations. The three main components are: a decoding device 122 to determine the quantized values from the coded bit stream, an inverse quantizing device 124 to form the subimages from the quantized values, and an inverse wavelet filtering device 126 to reconstruct the image from the subimages.

Figure 2:
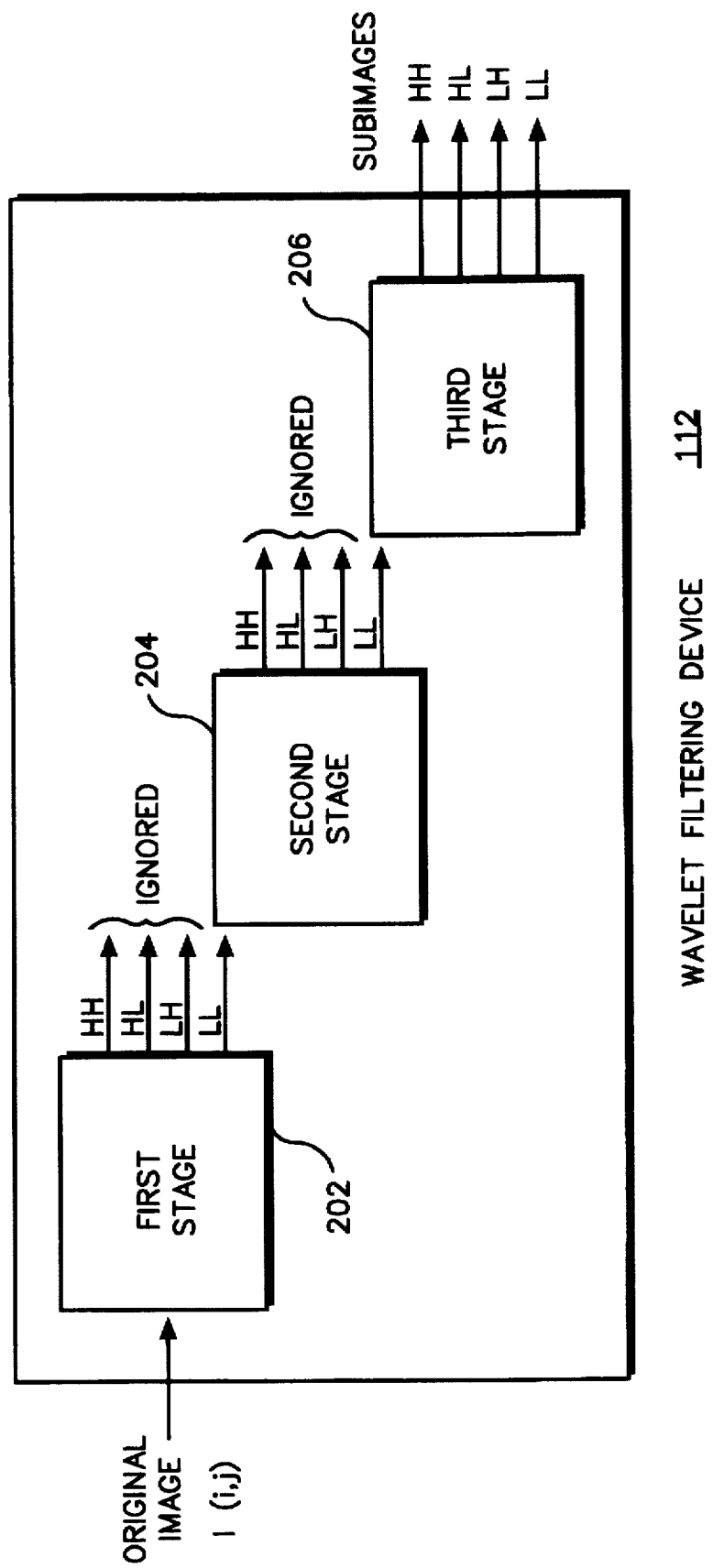
FIG. 2 is a block diagram illustrating a wavelet filtering device within a compression system designed for a compression ratio of approximately 40 in a preferred embodiment of the present invention.

FIG. 2 is a block diagram illustrating a wavelet filtering device 112 within the compression system 110 in a preferred embodiment of the present invention. The wavelet filtering device 112 utilizes multiple stages, specifically three stages. The number of stages used depends on the compression ratio required, among other factors. The compression ratio required varies depending on the specific application. In this case, a compression ratio of approximately 40 was specified for prototyping purposes.

The first stage 202 receives the original image I(i,j) and outputs four subimages one high-pass filtered in both i- and j-directions (HH), one high-pass filtered in the i-direction and low-pass filtered in the j-direction (HL), one low-pass filtered in the i-direction and high-pass filtered in the j-direction (LH), and one low-pass filtered in both i- and j-directions (LL). Each subimage has ½ the height and ½ the width of the original image and therefore has ¼ the number of pixels as the original image. The first three subimages (HH, HL, and LH) containing higher-frequency "detail" information are ignored, but the fourth subimage (LL) containing lower-frequency "coarse" information is passed onto the second stage 204. Information is purposefully lost in ignoring the three detail subimages and that the coarse subimage is meant to be a high-quality lossy approximation to the original image I(i,j). In practice, since the three detail subimages are ignored, the first stage 202 need not even generate them.

The second stage 204 receives the coarse subimage from the first stage 202 and, like the first stage, outputs four subimages: one high-pass filtered in both i- and j-directions (HH), one high-pass filtered in the i-direction and low-pass filtered in the j-direction (HL), one low-pass filtered in the i-direction and high-pass filtered in the j-direction (LH), and one low-pass filtered in both i- and j-directions (LL). Each subimage has ¼ the height and ¼ the width of the original image and therefore has ¹⁄₁₆ the number of pixels as the original image. Like the first stage 202, the first three subimages (HH, HL, and LH) containing higher-frequency detail information are ignored, while the fourth subimage (LL) containing lower-frequency coarse information is passed onto the third stage 206. Information is purposefully lost in ignoring the three detail subimages from the second stage and the coarse subimage from the second stage is meant to be a high-quality lossy approximation to the original image I(i,j). In practice, since the three detail subimages are ignored, the second stage 204 need not even generate them.

The third stage 206 receives the coarse subimage from the second stage 204 and, like the first and second stages, outputs four subimages including one high-pass filtered in both i- and j-directions (HH), one high-pass filtered in the i-direction and low-pass filtered in the j-direction (HL), one low-pass filtered in the i-direction and high-pass filtered in the j-direction (LH), and one low-pass filtered in both i- and j-directions (LL). Each subimage has ⅛ the height and ⅛ the width of the original image and therefore has ¹⁄₆₄ the number of pixels as the original image I(i,j). Unlike the first and second stages, however, none of the four subimages are ignored since all four subimages are output to the quantization device 114.

The bit budget for the subimages was determined by the compression ratio desired and was part of the specification to which the wavelet filtering device 112 was designed. In this case, the system was designed to have a compression ratio of approximately 40. The bit budget chosen influenced the determination of the number of stages (three) in the wavelet filtering device 112 and the ignoring of the three detail subimages of the first 202 and second 204 stages.

The particular bit budgets used were chosen for prototyping purposes only and corresponds to a compression ratio of approximately 40. Depending on the specific application, different bit budgets are desirable. Changing the bit budgets would affect the number of stages needed and the detail subimages to be ignored.

The fractions of the "bit budget" allocated to each subimage in the first stage are 0 for HH, ⅙ for HL, ⅙ for LH, and ⅔ for LL. For the second and third stages the fractions are ⅑ for HH, ²⁄₉ for HL, ²⁄₉ for LH, and ⁴⁄₉ for LL. These particular fractions were chosen for prototyping purposes only. Other fractions are possible.

Figure 3:
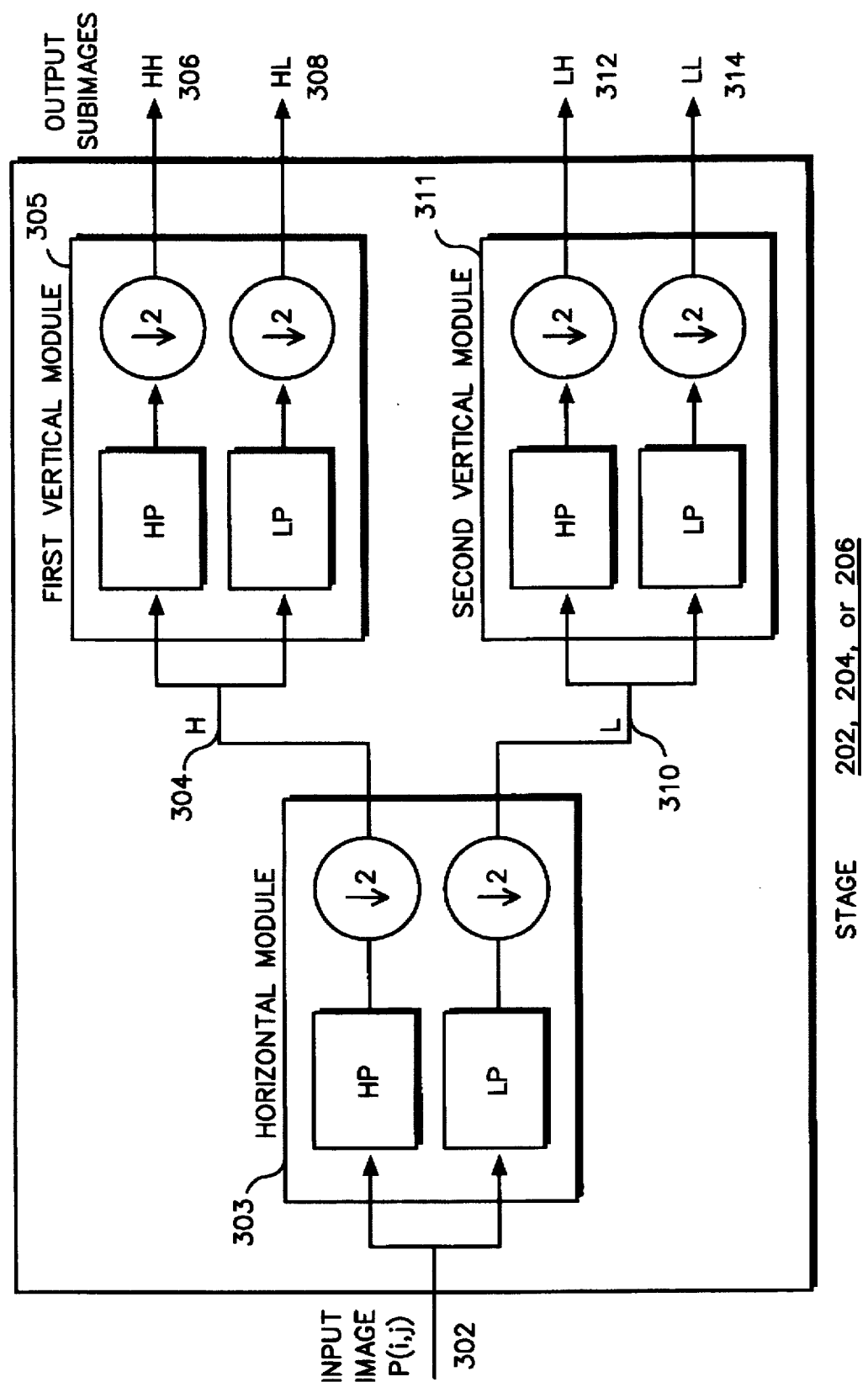
FIG. 3 is a block diagram illustrating a single stage of a wavelet filtering device within a compression system in a preferred embodiment of the present invention.

FIG. 3 is a block diagram illustrating a single stage 202, 204, or 206 of the wavelet filtering device 112 within the compression system 110 in a preferred embodiment of the present invention. The stage 202, 204, or 206 is implemented using three modules 303,305, and 311, each module comprising a Quadrature Mirror Filters (QMF) pair and a pair of downsamplers. Each QMF pair consists of two parts: a high-pass (HP) filter and a low-pass (LP) filter. Each downsampler downsamples by two (effectively removing every other pixel). One downsampler acts on the output of the HP filter and the other downsampler acts on the output of the LP filter. The input to the stage is an image in the form of a matrix of pixels represented by P(i,j) 302. If the stage is the first stage 202, then P(i,j)=I(i,j).

The image P(i,j) 302 is first input into a horizontal module 303. The horizontal module 303 high-pass filters the image P(i,j) 302 along the i-direction, then downsamples by two in the i-direction, resulting in a high-pass subimage H(i,j) 304. Due to the downsampling by two, the high-pass subimage H(i,j) 304 contains only one-half the number of pixels as P(i,j) 302.

Subsequently, the high-pass subimage H(i,j) 304 is input into a first vertical module 305. The first vertical module 305 high-pass filters the high-pass subimage H(i,j) 304 along the j-direction, then downsampled by two in the j-direction, resulting in a high-pass/high-pass subimage HH(i,j) 306. The high-pass subimage H(i,j) 304 is also low-pass filtered along the j-direction, then downsampled by two in the j-direction, resulting in a high-pass/low-pass subimage HL(i,j) 308. Due to the downsampling, the high-pass/high-pass subimage HH(i,j) 306 and the high-pass/low-pass subimage HL(i,j) 308 each contain only one-quarter the number of pixels as the image P(i,j) 302.

Similarly, the horizontal module 303 low-pass filters the image I(i,j) 302 along the i-direction, then downsamples by two in the i-direction, resulting in a low-pass subimage L(i,j) 310. Due to the downsampling, the low-pass subimage L(i,j) 310 contains only one-half the number of pixels as P(i,j) 302.

Subsequently, the low-pass subimage L(i,j) 310 is input into a second vertical module 311. The second vertical module 311 high-pass filters the low-pass subimage L(i,j) 310 along the j-direction, then downsampled by two in the j-direction, resulting in a low-pass/high-pass subimage LH(i,j) 312. The low-pass subimage L(i,j) 310 is also low-pass filtered along the j-direction, then downsampled by two in the j-direction, resulting in a low-pass/low-pass subimage LL(i,j) 314. Due to the downsampling, the low-pass/high-pass subimage LH(i,j) 312 and the low-pass/low-pass subimage LL(i,j) 308 each contain only one-quarter the number of pixels as the image P(i,j) 302.

Note that the horizontal module 303 acts substantially simultaneously to high-pass filter and low-pass filter the image P(i,j) 302 into the high-pass image H(i,j) 304 and the low-pass image L(i,j) 310.

Figure 4:
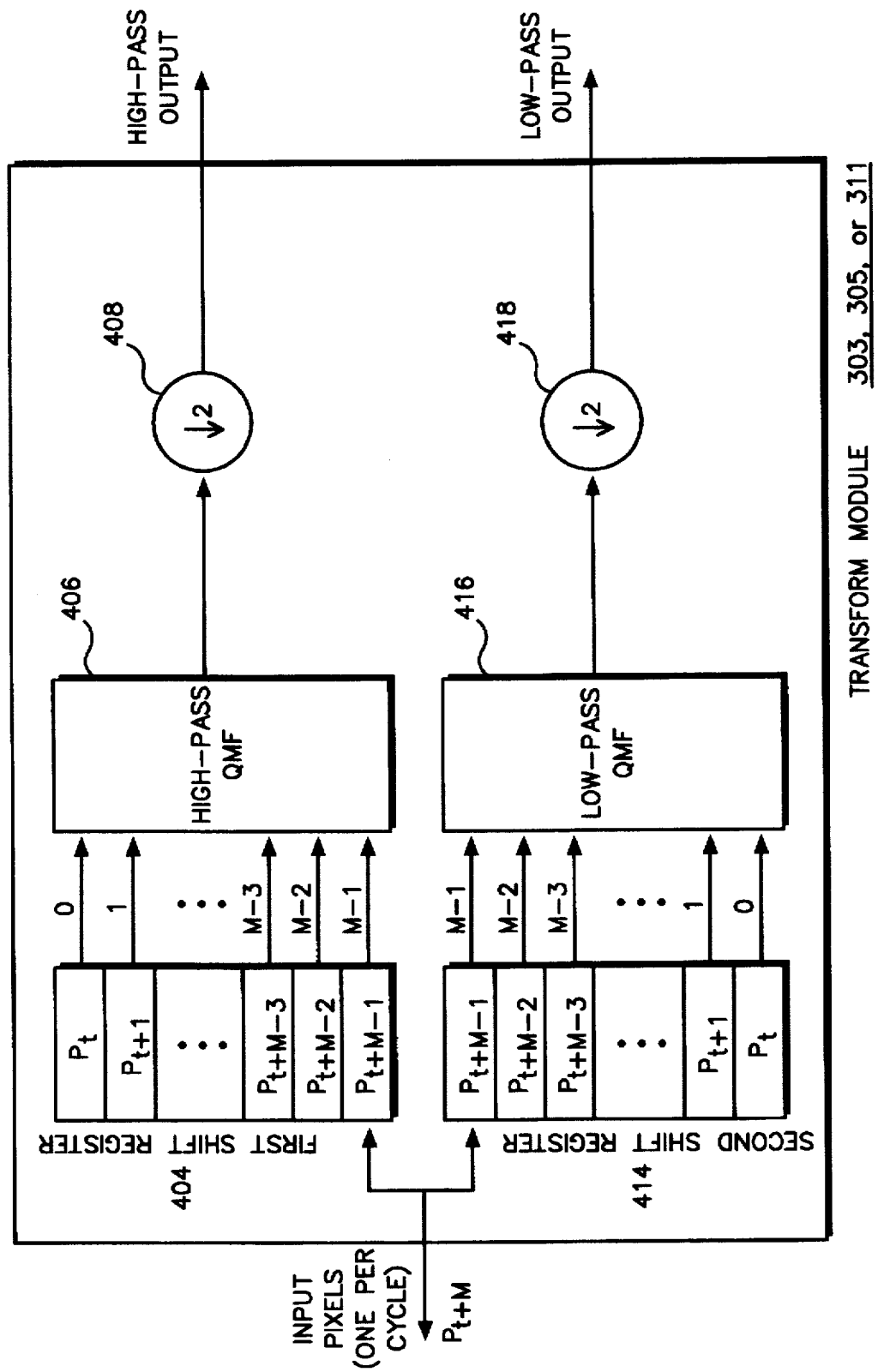
FIG. 4 is a block diagram illustrating a prior transform module, including two shift registers, a QMF pair, and two downsamplers, located within a stage of a wavelet filtering device.

FIG. 4 is a block diagram illustrating a prior transform module 303, 305, or 311, including two shift registers, a QMF pair, and two downsamplers by two, located within a single stage 202, 204, or 206 of the wavelet filtering device 112. Let P(i,j) represent the pixels of the image input into the module. If the module is the horizontal module 303 of the first stage 202, then P(i,j)=I(i,j). The order in which the pixels is input is along the i-direction if the module is the horizontal module 303 and is along the j-direction if the module is the first or the second vertical modules 305 or 311. The number of filter taps of the QMFs is defined to be the integer M. The filter coefficients of the QMFs are defined to be $C_0, C_1, C_2, \ldots, C_{M-2}$, and $C_{M-1}$. When the QMF is a high-pass QMF, then $C_0=H_0, C_1=H_1, C_2=H_2, \ldots, C_{M-2}=H_{M-2}, C_{M-1}=H_{M-1}$. When the QMF is a low-pass QMF, then $C_0=L_0, C_1=L_1, C_2=L_2, \ldots, C_{M-2}=L_{M-2}$, and $C_{M-1}=L_{M-1}$.

Consider that M pixels from row y [P(i,j), P(i,j+1), P(i,j+2), ..., P(i,j+M−2), and P(i,j+M−1)] are shifted into a first and a second shift register 404 and 414, respectively. The pixels are then transferred from the first shift register 404 to a high-pass QMF 406 and from the second shift register 414 to a low-pass QMF 416. The high-pass QMF 406 outputs $$H(i,j) = \sum_{k=0}^{M-1} H_k P(i,j+k). \quad \text{(Eq. 1)}$$

to the downsampler 408. The downsampler 408 downsamples by two the output of the high-pass QMF 406, meaning that it removes or ignores every other output from the high-pass QMF 406. The output of the downsampler 408 is the high-pass output of the horizontal module 303. Similarly, the low-pass QMF 416 outputs:

$$L(i,j) = \sum_{k=0}^{M-1} L_k P(i,j+k). \quad \text{(Eq. 2)}$$

to the downsampler 418. The downsampler 418 downsamples by two the output of the low-pass QMF 416, meaning that it removes or ignores every other output from the low-pass QMF 416. The output of the downsampler 418 is the low-pass output of the horizontal module 303.

Figure 5:
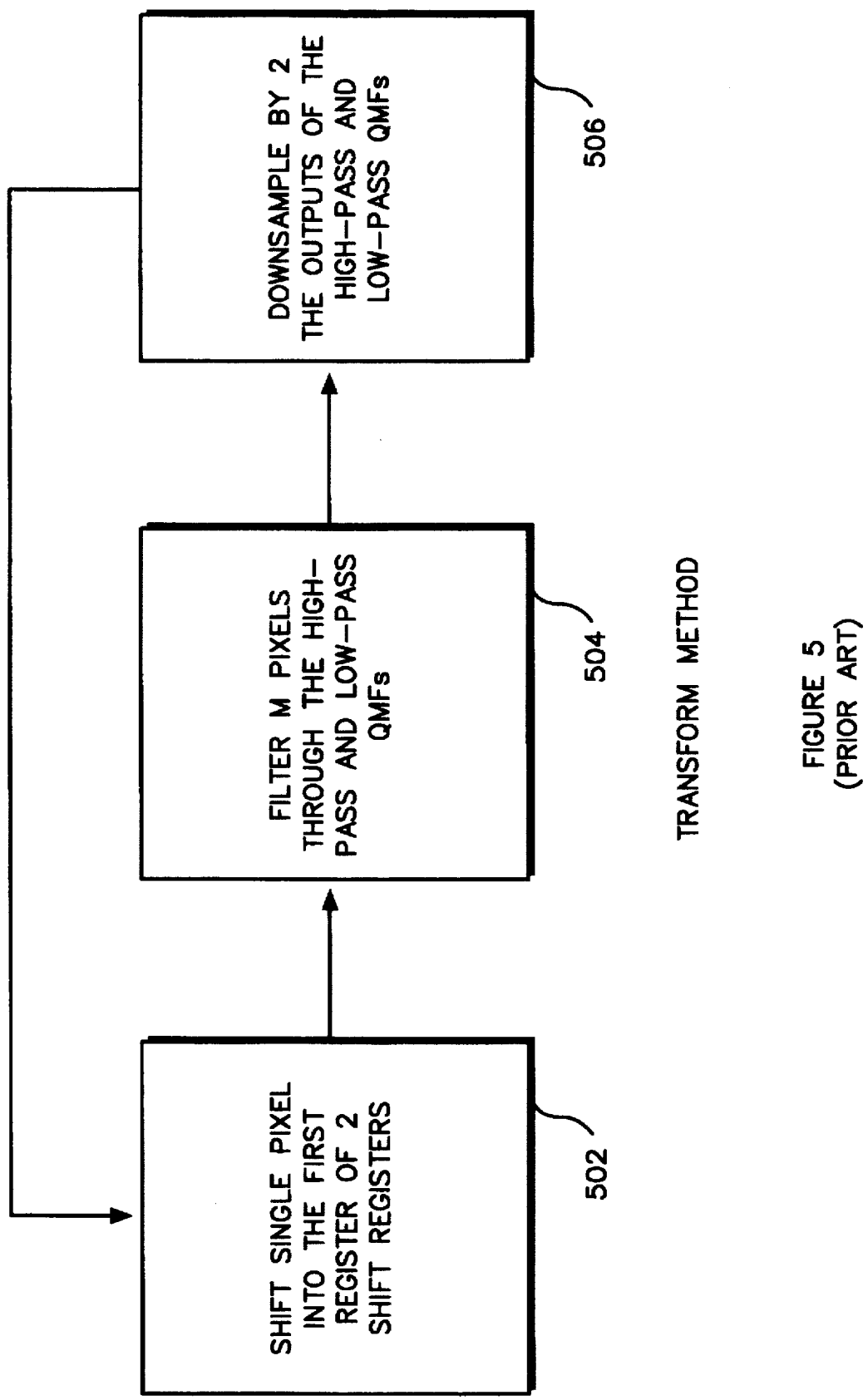
FIG. 5 is a flow diagram illustrating a prior transform method using a prior transform module located within a stage of a wavelet filtering device.

FIG. 5 is a flow diagram illustrating a "prior" transform method using the prior transform module 303, 305, or 311 located within a stage 202, 204, or 206 of a wavelet filtering device 112. First, the first memory cell of both shift registers 404 and 414 each receive 502 a single pixel. (Of course, at substantially the same time, a single pixel is also shifted out of the last cell of each shift register.) Next, the M pixels currently in each of the two shift registers 404 and 414 are transferred and filtered 504 through both the high-pass and low-pass QMFs 406 and 416. Finally, the outputs of the two QMFs are downsampled by two 506. The process then repeats itself with the first cell of both shift registers 404 and 414 each receiving the next single pixel.

Figure 6:
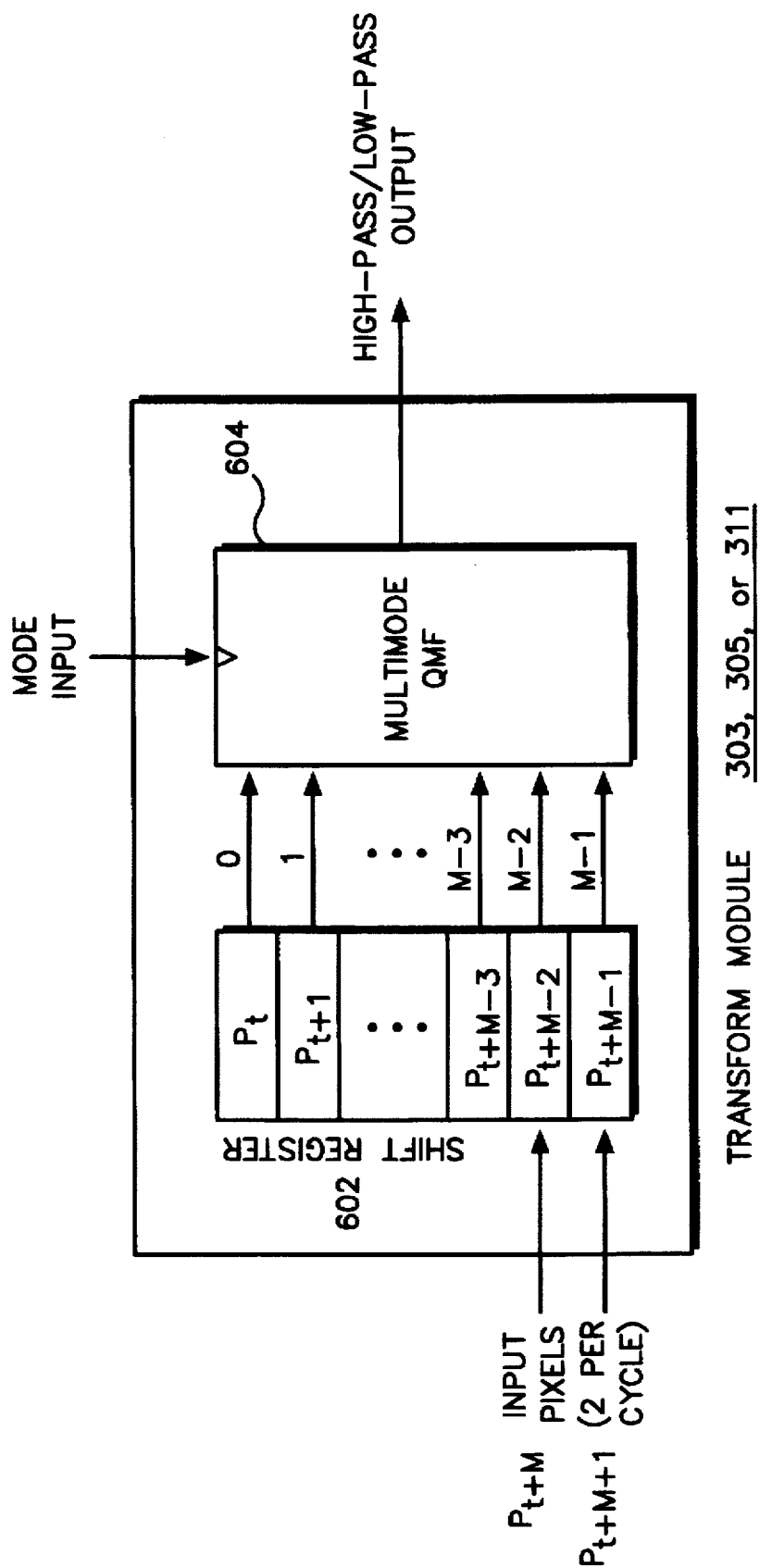
FIG. 6 is a block diagram illustrating a transform module, including one shift register and a multimode QMF, located within a stage of a wavelet filtering device in a preferred embodiment of the present invention.

FIG. 6 is a block diagram illustrating a transform module 303, 305, or 311, including one shift register and a multimode QMF, located within a stage 202, 204, or 206 of a wavelet filtering device 112 in a preferred embodiment of the present invention. Let P(i,j) represent the pixels of the image input into the module. The order in which the pixels is input is along the i-direction if the module is the horizontal module 303 and is along the j-direction if the module is the first or the second vertical modules 305 or 311. The number of filter taps of the QMFs is defined to be the integer M. For example, six filter taps may be used, in which case M=6. The filter coefficients of the QMFs are defined to be $C_0, C_1, C_2, \ldots, C_{M-2}$, and $C_{M-1}$. When the QMF is a high-pass QMF, then $C_0=H_0, C_1=H_1, C_2=H_2, \ldots, C_{M-2}=H_{M-2}, C_{M-1}=H_{M-1}$. When the QMF is a low-pass QMF, then $C_0=L_0, C_1=L_1, C_2=L_2, \ldots, C_{M-2}=L_{M-2}, C_{M-1}=L_{M-1}$.

Consider that M pixels from row y [P(i,j), P(i,j+1), P(i,j+2), ..., P(i,j+M−2), and P(i,j+M−1)] are shifted two-at-a-time into a single shift register 602. A multimode QMF 604 is toggled from low-pass to high-pass mode or vice versa. The M pixels currently in the shift register 602 are transferred to the multimode QMF 604. If the multimode QMF 604 is in high-pass mode, then the multimode QMF 604 outputs $$H(i,j) = \sum_{k=0}^{M-1} H_k P(i,j+k). \quad \text{(Eq. 3)}$$

If the multimode QMF 604 is in low-pass mode, then the multimode QMF 604 outputs $$L(i,j) = \sum_{k=0}^{M-1} L_k P(i,j+k). \quad \text{(Eq. 4)}$$

Switching between high-pass and low-pass modes requires switching certain filter coefficients (or equivalently switching the corresponding pixels) and multiplying other certain filter coefficients by negative one (or equivalently multiplying the corresponding pixels by negative one). The implementation of such a multimode QMF 604 is well known to those of ordinary skill in the art.

The output of the multimode QMF 604 is the output of the transform module 303, 305, or 311 and no downsampling by two is necessary because the pixels are shifted two-at-a-time into the shift register.

The low-pass output of the multimode QMF 604 is stored in a low-pass storage buffer at location (t+M−1)/2. In contrast, the high-pass output of the multimode QMF 604 is stored in a high-pass storage buffer at location (t+1)/2. This is because the low-pass filter uses "back" pixel values while the high-pass filter uses "future" pixel values.

Figure 7:
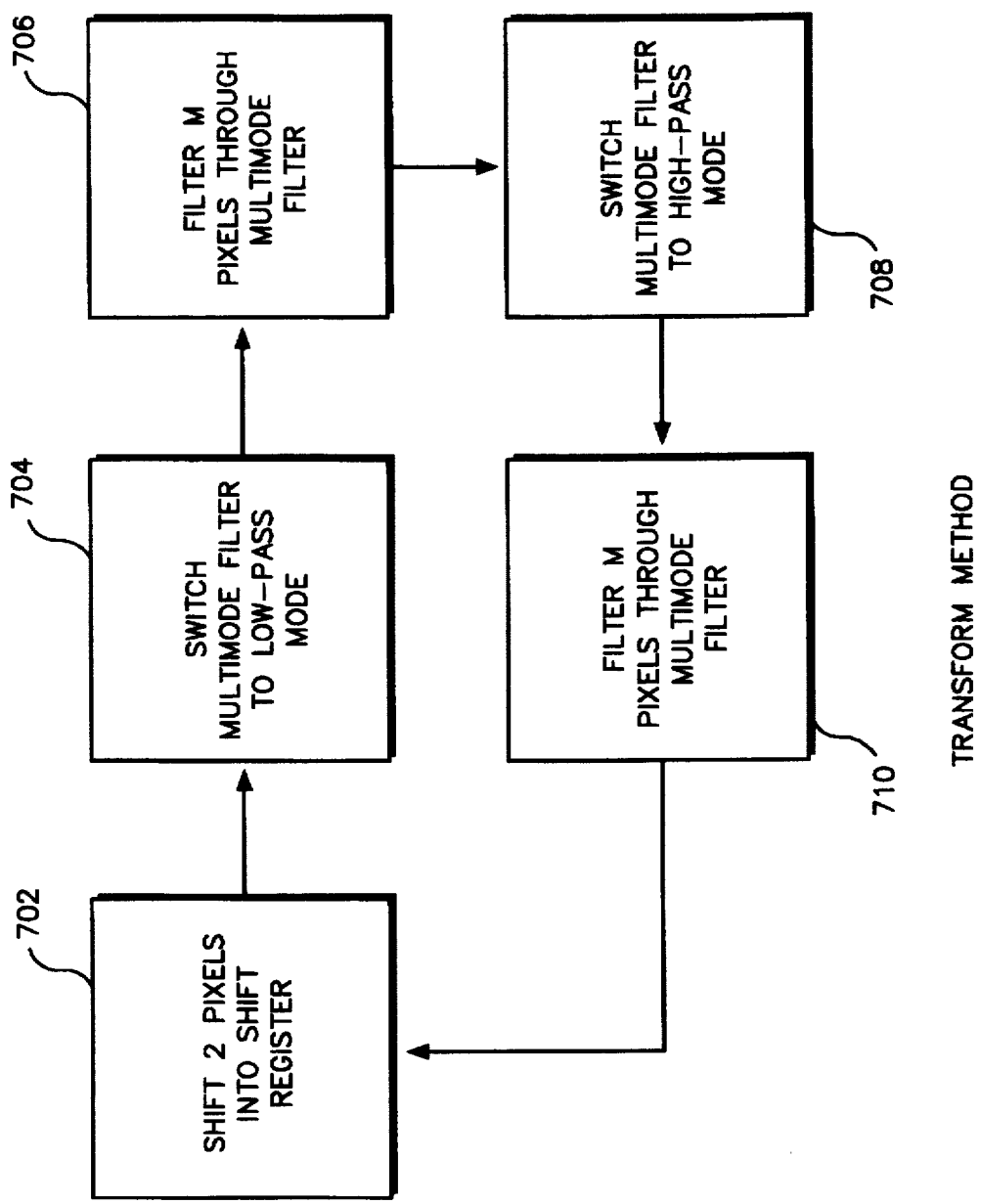
FIG. 7 is a flow diagram illustrating a transform method using a transform module located within a stage of a wavelet filtering device in a preferred embodiment of the present invention.

FIG. 7 is a flow diagram illustrating a transform method using the transform module located within a stage of a wavelet filtering device in a preferred embodiment of the present invention. First, pixels are shifted two-at-a-time 702 into the first two cells of the single shift register 602. Second, the multimode QMF 604 is toggled from low-pass mode to high-pass mode (or vice versa). Third, the M pixels in the single shift register 602 are filtered 706 through the multimode QMF 604. Fourth, the multimode QMF 604 is toggled from high-pass mode to low-pass mode (or vice versa). Fifth, the M pixels in the single shift register 602 are filtered through the multimode QMF 6-4. The process is then repeated starting with the next two pixels being shifted 702 into the first two cells of the single shift register 602, and the multimode QMF 604 being toggled 704 from high-pass mode to low-pass mode or vice versa.

Figure 8:
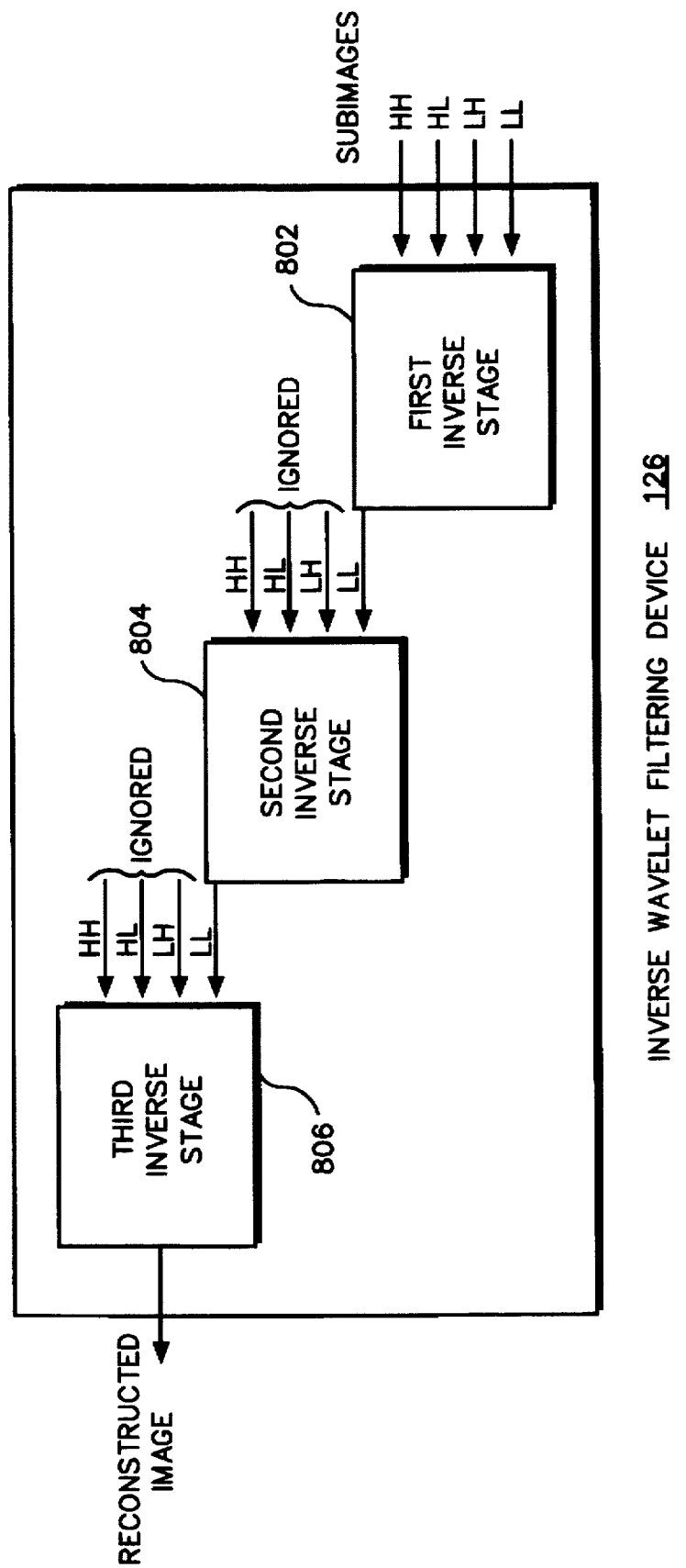
FIG. 8 is a block diagram illustrating an inverse wavelet filtering device within a decompression system designed to match the wavelet filtering device shown in FIG. 2 in a preferred embodiment of the present invention.

FIG. 8 is a block diagram illustrating an inverse wavelet filtering device 126 within a decompression system 120 in a preferred embodiment of the present invention. The inverse wavelet filtering device 126 utilizes the same number of stages (three) as the wavelet filtering device 112.

The first inverse stage 802 receives from the inverse quantizer 802 four subimages including one high-pass filtered in both i- and j-directions (HH), one high-pass filtered in the i-direction and low-pass filtered in the j-direction (HL), one low-pass filtered in the i-direction and high-pass filtered in the j-direction (LH), and one low-pass filtered in both i- and j-directions (LL). Each subimage has ⅛ the height and ⅛ the width of the original image and therefore has 1/64 the number of pixels as the original image. These four subimages correspond to the four subimages output by the third stage 206 of the wavelet filtering device 112. The first inverse stage 802 combines the four subimages and outputs the combined image to the LL input of the second inverse stage 804. The combined image has ¼ the height and ¼ the width of the original image and therefore has 1/16 the number of pixels as the original image.

Since the three detail subimages output by the second stage 204 of the wavelet filtering device 112 were ignored, the only necessary input to the second inverse stage 804 is the output of the first inverse stage 802. The second inverse stage 804 takes the output of the first inverse stage 802 and outputs an image which has ½ the height and ½ the width of the original image and therefore has ¼ the number of pixels as the original image.

Since the three detail subimages output by the first stage 202 of the wavelet filtering device 112 were ignored, the only necessary input to the third inverse stage 806 is the output of the second inverse stage 804. The third inverse stage 806 takes the output of the second inverse stage 804 and outputs a reconstructed image which has the same height and the same width of the original image; it has the same number of pixels as the original image.

Figure 9:
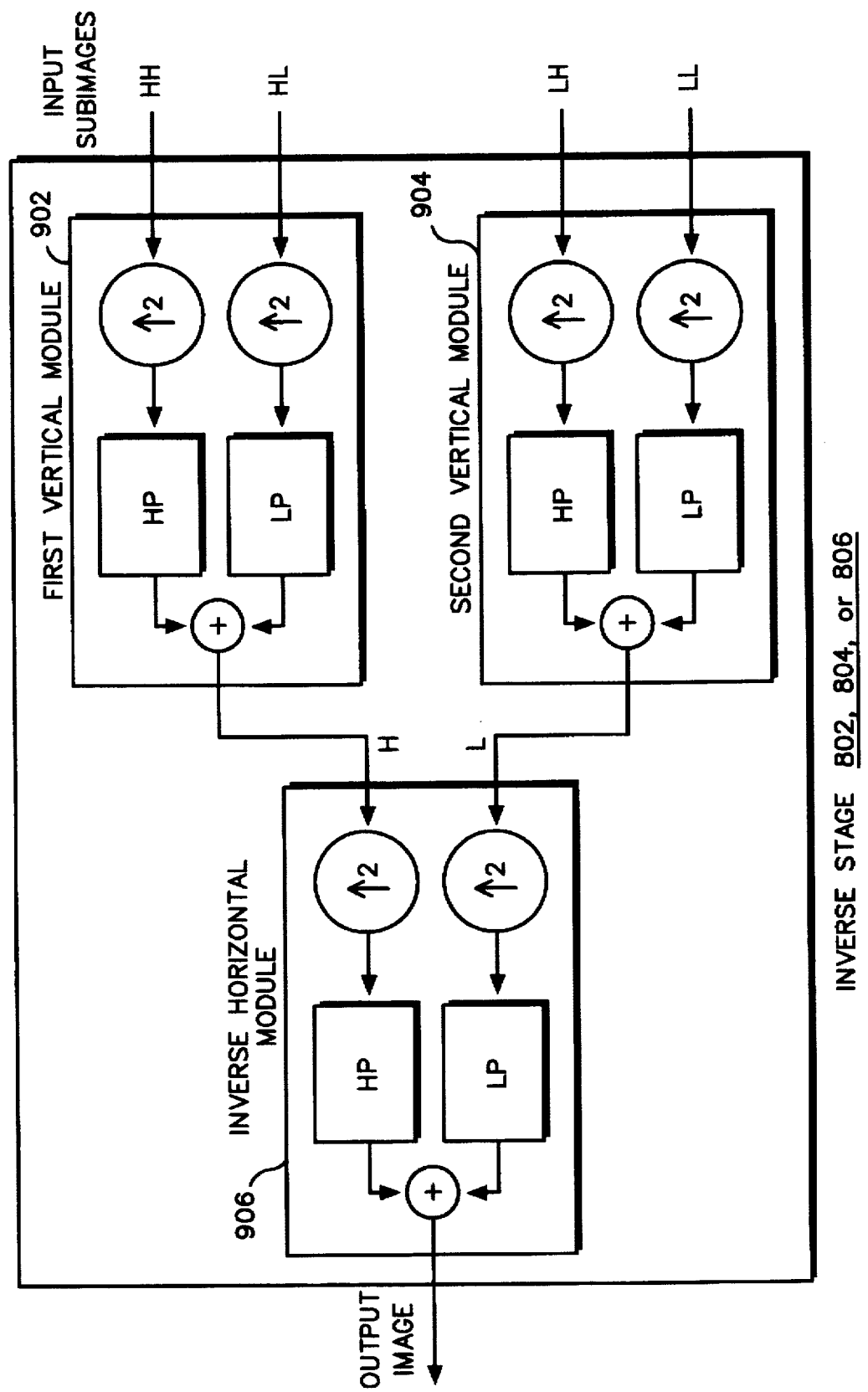
FIG. 9 is a block diagram illustrating a stage of an inverse wavelet filtering device within a decompression system in a preferred embodiment of the present invention.

FIG. 9 is a block diagram illustrating a single inverse stage 802, 804, or 806 of an inverse wavelet filtering 126 device within a decompression system 120 in a preferred embodiment of the present invention. The inverse stage 802, 804, or 806 is implemented using three modules 902, 904, and 906, each module comprising a pair of upsamplers and a filter pair. Each upsampler upsamples by two (effectively inserting a zero valued pixel between every two pixels). Each filter pair includes a high-pass (HP) filter and a low-pass (LP) filter. The HP filter acts on the output of one upsampler, and the LP filter acts on the output of the other upsampler. Four subimages (HH, HL, LH, and LL) are input into the inverse stage 802, 804, or 806.

Two of the subimages (HH and HL) are input into the first inverse vertical module 902. Each of the two subimages are upsampled. The HH subimage is then filtered through the HP filter, while the HL subimage is filtered through the LP filter. After filtering, the two subimages are added together to produce an H subimage.

Similarly, two of the subimages (LH and LL) are input into the second inverse vertical module 904. Each of the two subimages are upsampled. The LH subimage is then filtered through the HP filter, while the LL subimage is filtered through the LP filter. After filtering, the two subimages are added together to produce an L subimage.

The H and L subimages are input into the inverse horizontal module 906. Each of the two subimages are upsampled. The H subimage is then filtered through the HP filter, while the L subimage is filtered through the LP filter. After filtering, the two subimages are added together to produce an output image.

Figure 10:
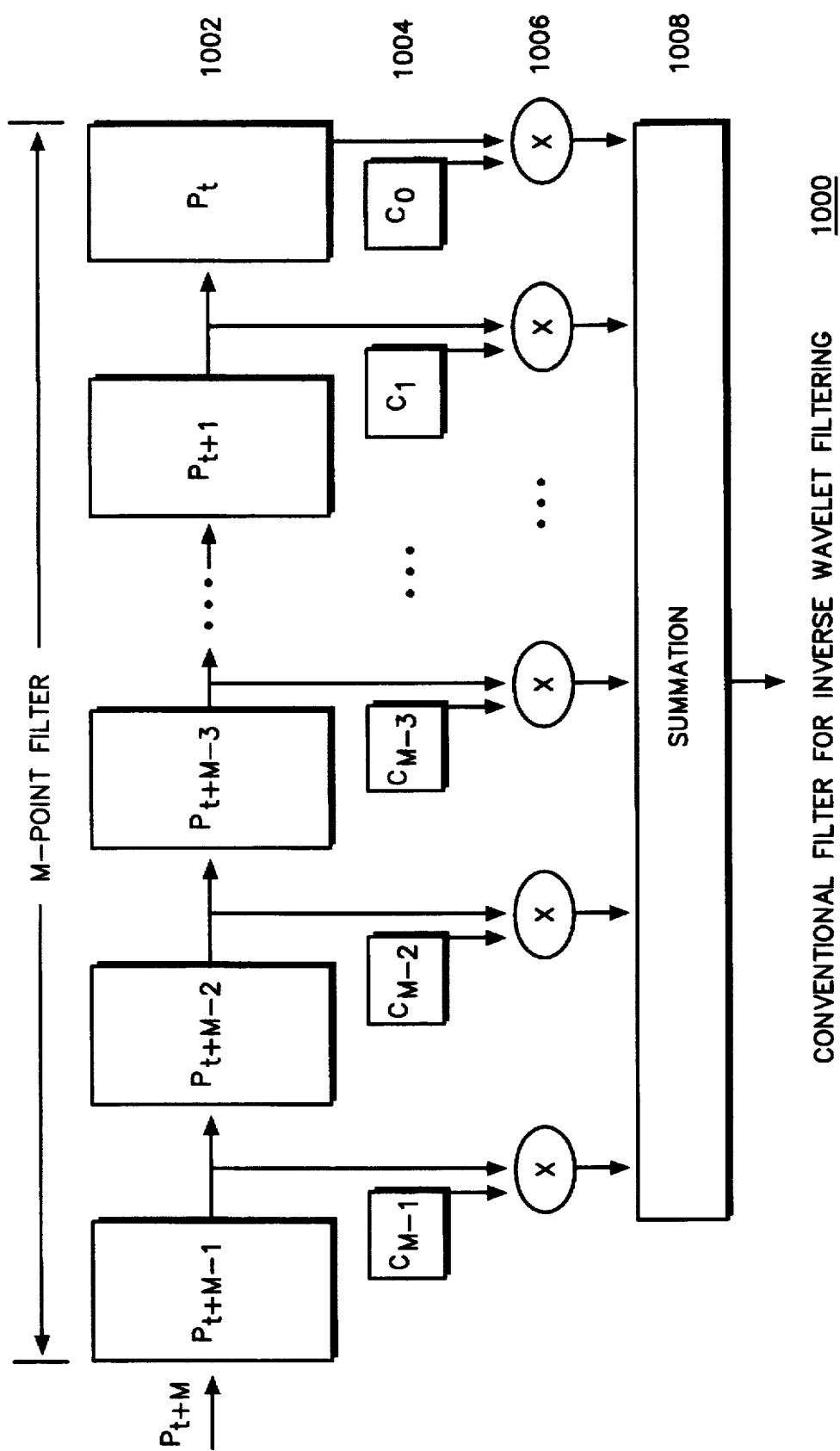
FIG. 10 is a block diagram illustrating a prior conventional filter for inverse wavelet filtering.
Figure 13:
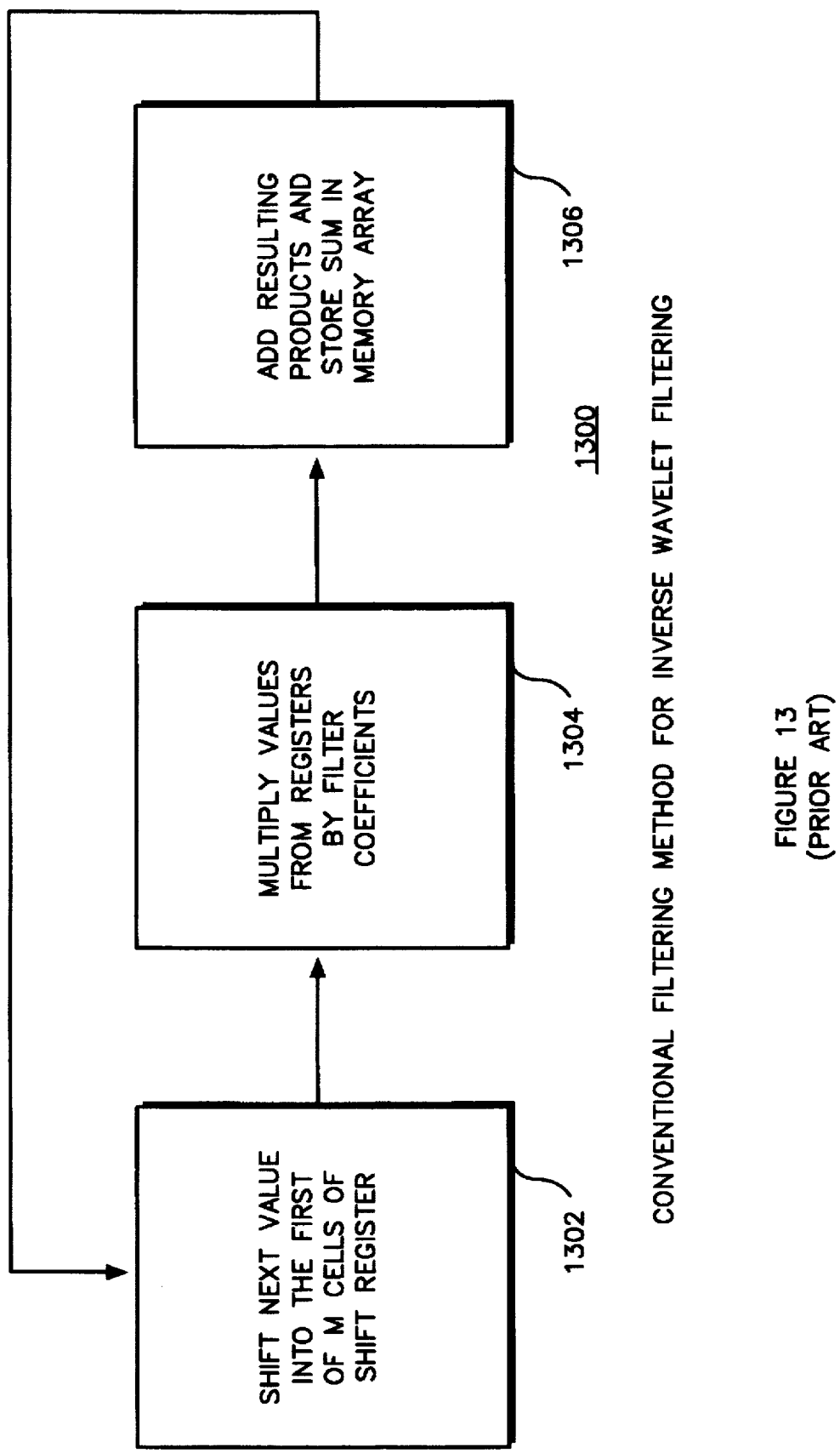
FIG. 13 is a flow diagram illustrating a conventional filtering method.

FIG. 10 is a block diagram illustrating a prior conventional filter 1000 for inverse wavelet filtering. In conjunction with FIG. 10, FIG. 13 is a flow diagram illustrating the conventional filtering method.

The conventional filter 1000 is a standard implementation intended for general purpose FIR filtering applications. The conventional filter 1000 is an M-point filter, where M is an even integer. The values of the M cells 1002 of the register at an instant in time are shown in FIG. 10.

First, the next filtered value from the upsampled stream is shifted 1302 into the M cells 1002 every clock cycle. The filtered values from M cells 1002 are multiplied 1304 by the filter coefficients 1004 in the multipliers 1006. The resulting products are summed together in adders 1008 and then outputted 1306.

Although the conventional filter 1000 does implement inverse wavelet filtering, it does so inefficiently because it does not take into account a special characteristic of the upsampled stream of filtered values. The special characteristic of the upsampled stream is that every alternate value is zero. Because of this special characteristic, the following inefficiencies exist in the conventional filter 1000:

1. At any instant in time, half of the registers contain a value of zero.
2. At every alternate clock cycle, a zero value is shifted into the filter.
3. Given two consecutive clock cycles, the same set of nonzero values are multiplied by two different sets of coefficients.

Based on the above inefficiencies, the filter may be further optimized depending on the type of application (high or low throughput applications).

Figure 11:
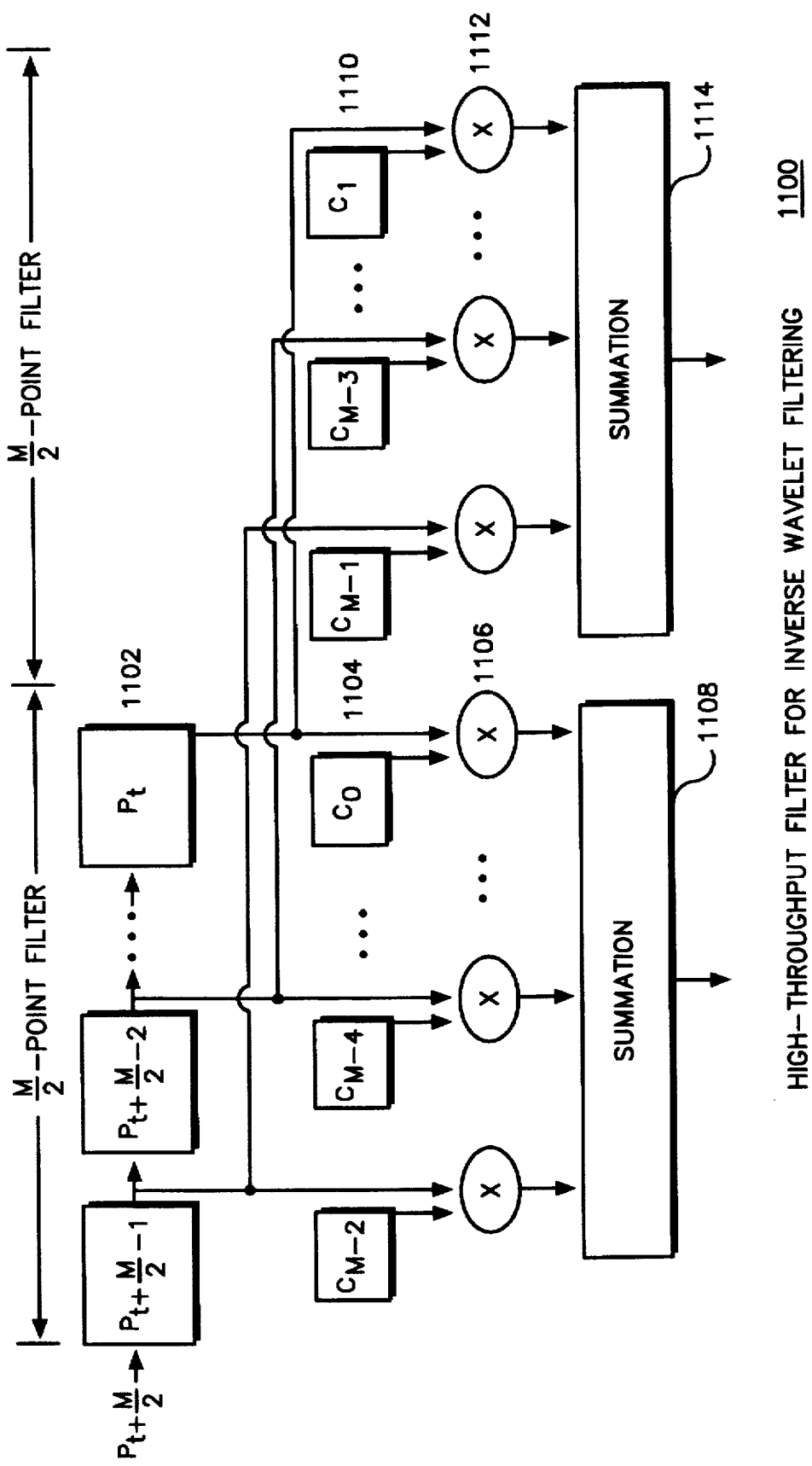
FIG. 11 is a block diagram illustrating a high-throughput filter for inverse wavelet filtering in a preferred embodiment of the present invention.
Figure 14:
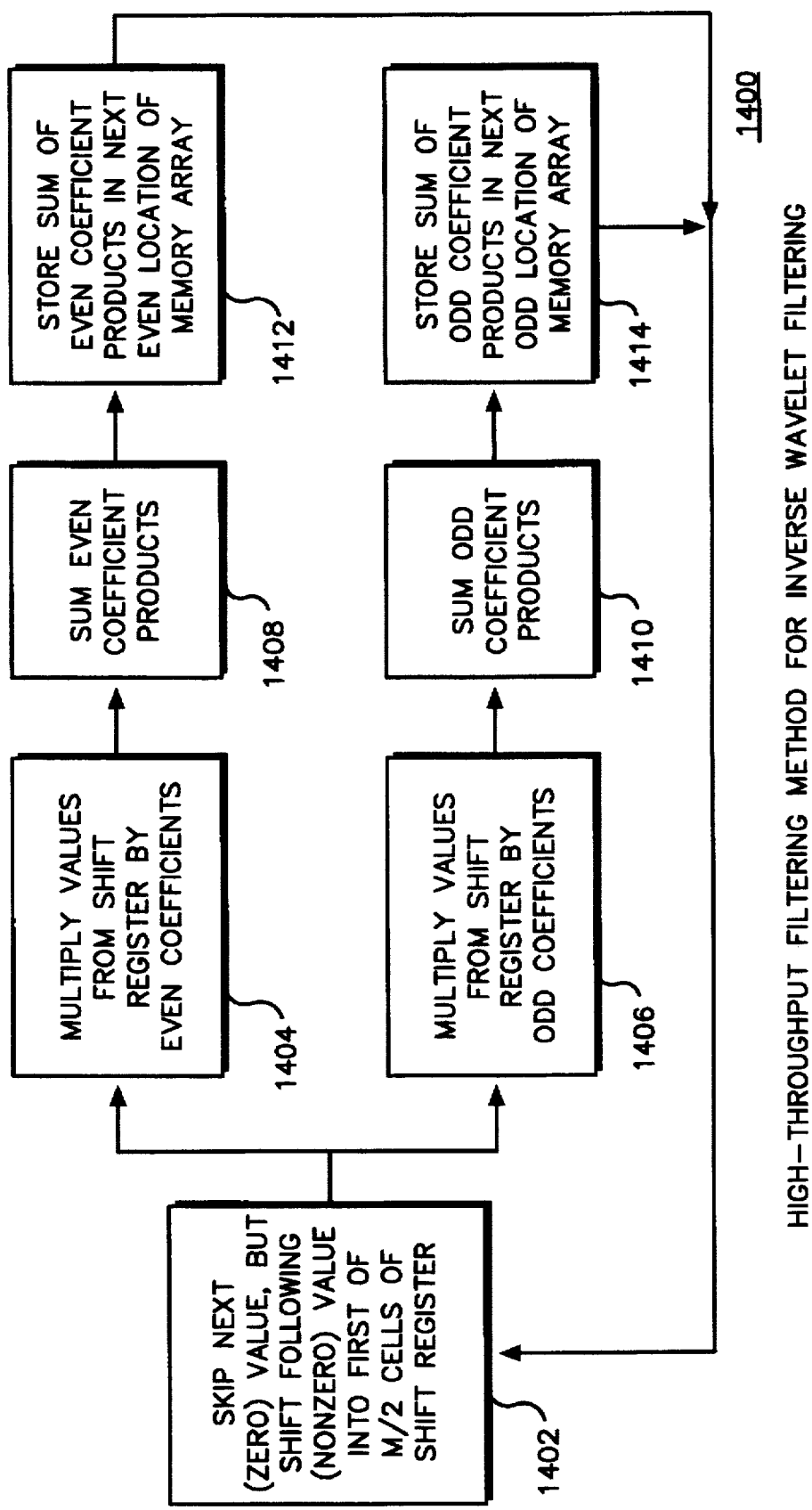
FIG. 14 is a flow diagram illustrating the high-throughput filtering method of a preferred embodiment of the present invention.

FIG. 11 is a block diagram illustrating a high-throughput filter 1100 for inverse wavelet filtering in a preferred embodiment of the present invention. In conjunction with FIG. 11, FIG. 14 is a flow diagram illustrating the high-throughput filtering method of a preferred embodiment of the present invention. The high-throughput filter 1100 uses the fact that the input stream is an upsampled stream and not a random stream of values to increase the throughput of the filter.

The high-throughput filter 1100 is an M/2-point filter, where M is an even integer. Compared to the conventional filter 1000, half the registers are eliminated in the high-throughput filter. The values of the M/2 cells 1102 of the register at an instant in time are shown in FIG. 11.

First, a new nonzero value is shifted 1402 into the filter every clock cycle while the zero values in between the nonzero values are not shifted into the filter. The values of the M/2 cells 1102 are multiplied 1404 and 1406 by two sets of constants 1104 and 1110 in two sets of multipliers 1106 and 1112. The first set of constants 1104 comprise the even filter coefficients ($C_0$, $C_2$, $C_4$, ..., $C_{M-4}$, and $C_{M-2}$); the second set of constants 1110 comprise the odd filter coefficients ($C_1$, $C_3$, $C_5$, ..., $C_{M-3}$, and $C_{M-1}$). The resulting products are summed together 1408 and 1410 in two sets of adders 1108 and 1114. The two sets of adders 1108 and 1114 output two different results each clock cycle. Thus, the high-throughput filter 1100 is able to achieve double the throughput as the conventional filter 1000 while keeping the area needed on an integrated circuit chip to implement the filter approximately the same.

If the high-throughput filter 1100 is an inverse high-pass filter, then the outputs of the sets of adders 1108 and 1114 are stored in a high-pass storage buffer at locations 2t+M−2 and 2t+M−1, respectively. In contrast, if the high-throughput filter 1100 is an inverse low-pass filter, then the output of the sets of adders 1108 and 1114 are stored in a low-pass storage buffer at locations 2t and 2t+1, respectively. This is because the inverse high-pass filter uses "back" values while the inverse low-pass filter uses "future" values.

Figure 12:
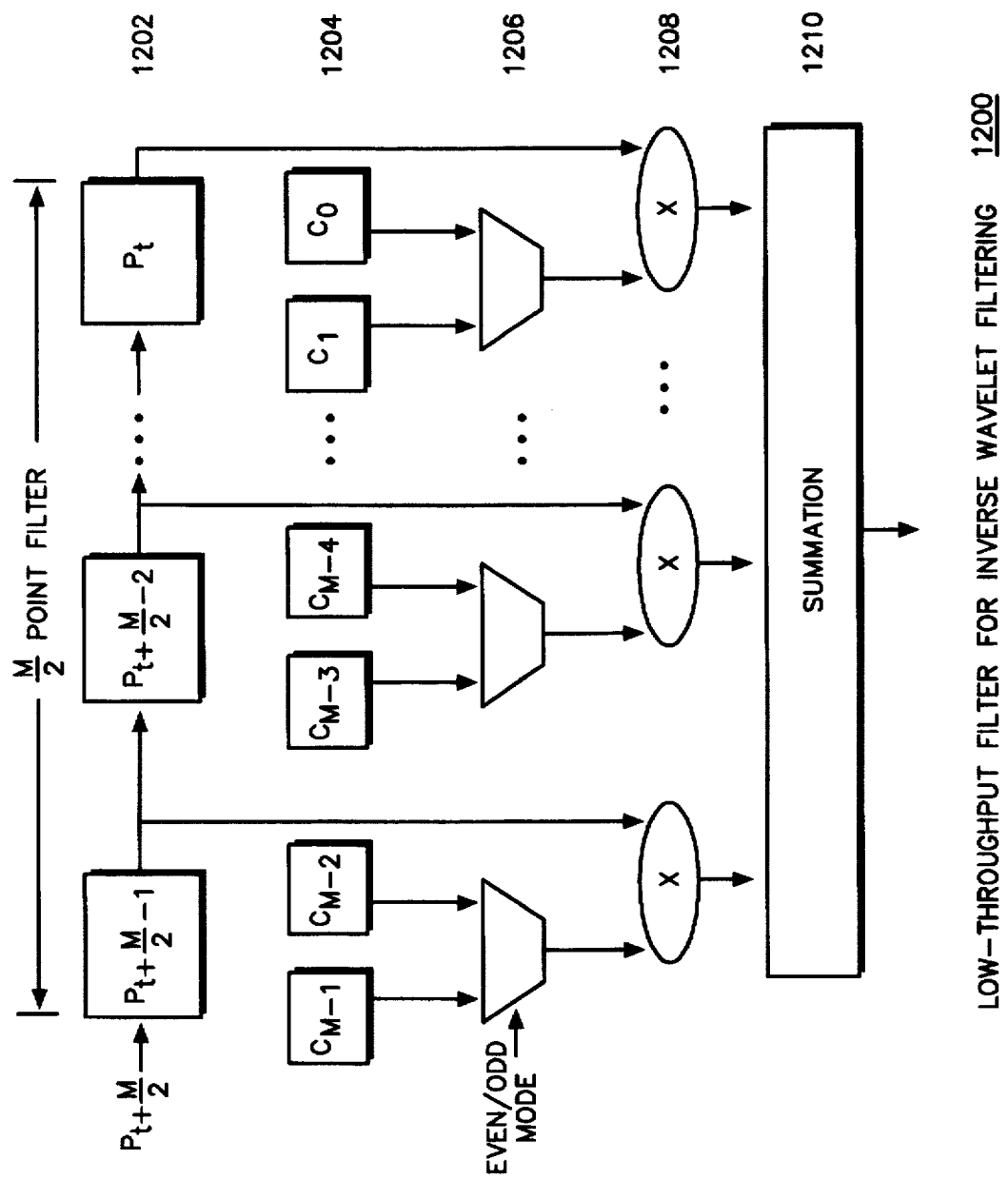
FIG. 12 is a block diagram illustrating a low-throughput filter for inverse wavelet filtering in a preferred embodiment of the present invention.
Figure 15:
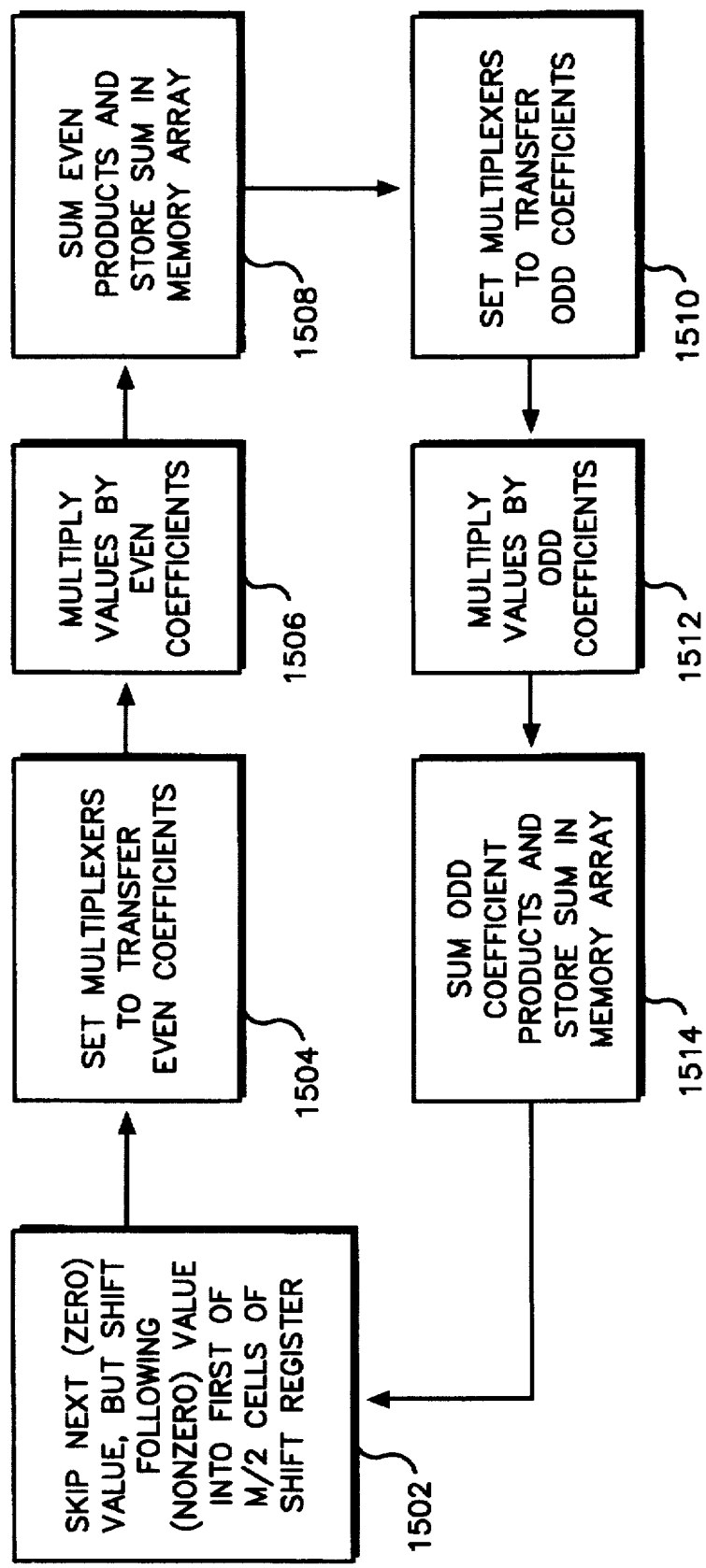
FIG. 15 is a flow diagram illustrating the low-throughput filtering method of a preferred embodiment of the present invention.

FIG. 12 is a block diagram illustrating a low-throughput filter 1200 in a preferred embodiment of the present invention. In conjunction with FIG. 12, FIG. 15 is a flow diagram illustrating the low-throughput filtering method of a preferred embodiment of the present invention. The low-throughput filter 1200 uses the fact that the input stream is an upsampled stream and not a random stream of pixels to reduce the area required on an integrated circuit chip to implement the filter.

Like the high-throughput filter 1100, the low-throughput filter 1200 is an M/2-point filter, where M is an even integer. Compared to the conventional filter 1000, only a register of half the size is needed to store the filtered values in the low-throughput filter 1200. The values of the M/2 memory cells 1202 at an instant in time are shown in FIG. 12.

First, a nonzero value is shifted 1502 into the filter every alternate clock cycle while the zero values in between the nonzero values are not shifted into the filter. At every clock cycle the mode of the multiplexers 1206 is toggled between even and odd modes 1504 and 1510. The values of the memory cells 1202 are multiplied in the set of multipliers 1208 by two sets of constants 1204 depending on the mode of the multiplexers 1206. When the multiplexers 1206 are in the even mode, the values are multiplied 1506 by the even filter coefficients ($C_0$, $C_2$, $C_4$, ..., $C_{M-4}$, and $C_{M-2}$). When the multiplexers 1206 are in the odd mode, the values are multiplied 1512 by the odd filter coefficients ($C_1$, $C_3$, $C_5$, ..., $C_{M-3}$, and $C_{M-1}$). For either the even mode or the odd mode, the resulting products of the multipliers 1208 are summed together in adders 1210 and the sum is outputted 1508 and 1514.

If the low-throughput filter 1200 is an inverse high-pass filter, then the output of the set of adders 1210 in even and odd modes are stored in a high-pass storage buffer at locations 2+M−2 and 2t+M−1, respectively. In contrast, if the low-throughput filter 1200 is an inverse low-pass filter, then the output of the set of adders 1210 in even and odd modes are stored in a low-pass storage buffer at locations 2t and 2t+1, respectively. This is because the inverse high-pass filter uses "back" values while the inverse low-pass filter uses "future" values.

Thus, during a clock cycle in the even mode the filtering is performed with the even filter coefficients, and during a clock cycle in the odd mode the filtering is performed with the odd filter coefficients. Compared with the conventional filter 1000, the low-throughput filter 1200 uses only half the number of memory cells, multipliers, and adders. However, an extra set of multiplexers is required. In conclusion, the low-throughput filter 1200 is able to achieve the same throughput as the conventional filter 1000 while reducing the area required for implementation by approximately a factor of two.

Now consider a two-dimensional image or filtered image represented by an I by J matrix of values. The top left value having coordinate (0,0) and the bottom fight value having coordinate (I−1, J−1).

With wavelet filtering or inverse wavelet filtering, it is necessary to use values from outside the matrix boundaries. When applying the high-pass filter on row i, "future" pixel values after the end of the row are needed. When applying the low-pass filter, "back" pixel values before the start of the row are required. Conversely, when applying the inverse high-pass filter, "back" filtered values before the start of the row are needed, while when applying the inverse low-pass filter, "future" filtered values after the end of the row are required.

There is a certain derivable relationship between the extended pixel values and the extended filtered values. Assuming values for either, values for the other can be computed. This computation, however, has to be done on the side and is a nuisance during implementation.

A prior technique to eliminate the need for the side computation is to assume that a row (or column) of values (whether pixel values or filtered values) is cyclical. Following this technique, the "future" values for a row (or column) start at the beginning of the same row (or column), and the "back" values for a row (or column) start at the end of the same row (or column). This assumption is illustrated in FIG. 16. The cyclical boundary conditions are illustrated for a general row i 1602 and for a general column j 1604.

Figure 17:
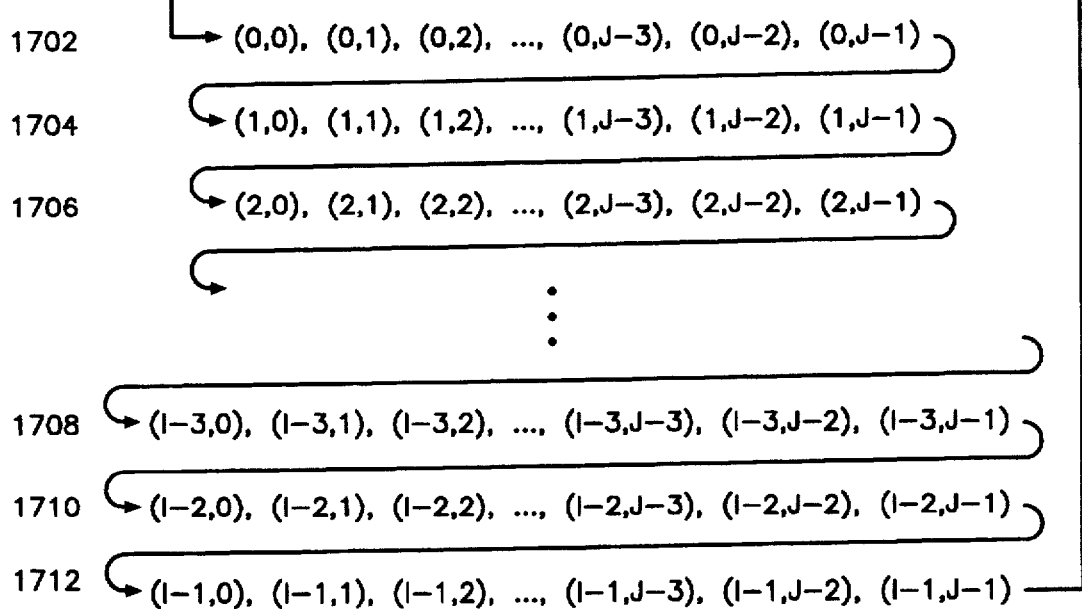
FIG. 17 is a diagram illustrating a "raster scan" implementation of a technique for overcoming the necessity for side computations in a preferred embodiment of the present invention.
Figure 18:
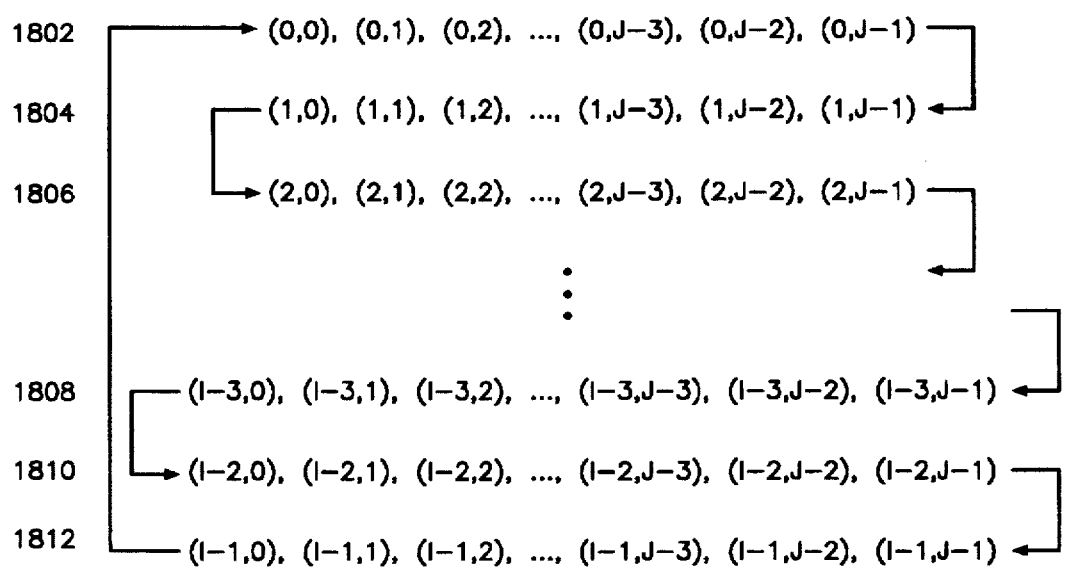
FIG. 18 is a diagram illustrating a "zig-zag" implementation of a technique for overcoming the necessity for side computations in a preferred embodiment of the present invention.

FIGS. 17 and 18 are diagrams illustrating implementations of a technique for overcoming the necessity of the side computations. The technique treats the two-dimensional matrix of values as a one-dimensional array of values.

Treating the two-dimensional matrix as a one-dimensional array has an advantage over transforming individual rows in that it saves the overhead required to flush the registers of prior values from the row just processed and to load the registers with the initial values of the row to be processed. The only flushing and loading needed is between frames, instead of between rows (or columns).

FIG. 17 is a diagram illustrating one implementation of the technique of treating a two-dimensional matrix of values as a one-dimensional array according to a preferred embodiment of the present invention. As shown in FIG. 17, each row is transversed from left-to-right, in "raster scan" order. The "future" extension of each row continues to the beginning of the next row. The "back" extension of each row continues from the end of the preceding row. For the first row 1702, the "back" extension continues from the end of the last row 1710. For the last row 1710, the "future" extension continues to the beginning of the first row 1702.

While FIG. 17 illustrates the implementation applied to rows, the same implementation is of course applicable to columns as well. When the two-dimensional matrix of values is transversed horizontally, the implementation as applied to rows is used. When the matrix is traversed vertically, the implementation as applied to columns is used.

An advantage of this raster scan implementation is that it makes it easy to maintain the correlation of values along each column for when the matrix is traversed vertically. A disadvantage is that any correlation between values at the edges of adjacent rows is not utilized.

FIG. 18 is a diagram illustrating another implementation of the technique of treating the two-dimensional matrix of values as a one-dimensional array. In the implementation of FIG. 18, the rows are traversed in "zig-zag" order. Each row with an even i-value (art even row) is traversed from left-to-right, while each row with an odd i-value (an odd row) is traversed from right-to-left.

The "future" extension of each even row continues to the end of the next row, while the "future" extension of each odd row continues to the beginning of the next row. The "back" extension of each even row continues from the beginning of the previous row, while the "back" extension of each odd row continues from the end of the previous row. For the first row 1802, the "back" extension continues from the beginning of the last row 1810. For the last row 1810, the "future" extension continues to the beginning of the first row 1802.

An advantage of this zig-zag implementation is that it takes advantage of any correlation between values at the edges of adjacent rows. A disadvantage is that it makes it difficult to maintain the correlation of values along each column for when the matrix is traversed vertically.

Figure 19:
FIG. 19 is an original 8 bits per pixel 512×512 image of "Lena."
Figure 20:
FIG. 20 is a reconstructed image of Lena after JPEG compression at a compression ratio of approximately 40.
Figure 21:
FIG. 21 is a reconstructed image of Lena after wavelet compression at a compression ratio of approximately 40 using a preferred embodiment of the present invention.

FIGS. 19-21 are described above in the Background of the Invention.

What is claimed is:

1. In an integrated circuit device for wavelet transformation, including a shift register and a multimode filter, in a wavelet compression system for multimedia computing; a method for transforming a signal of pixels comprising:

shifting a pair of pixels into a first pair of cells of the shift register and shifting another pair of pixels out of a last pair of cells of the shift register;

switching the multimode filter to a high-pass mode;

passing all pixels currently contained in the shift register through the multimode filter to form a high-pass output;

switching the multimode filter to a low-pass mode; and passing all pixels currently contained in the shift register through the multimode filter to form a low-pass output.

2. The method of claim 1, wherein the signal of pixels represents a two-dimensional image.

3. The method of claim 1, wherein switching the multimode filter comprises reversing the order of the filter coefficients and multiplying every other filter coefficient by a value of negative one.

4. The method of claim 2, wherein the signal of pixels is ordered along either a horizontal direction or a vertical direction of the two-dimensional image.

5. The method of claim 3, wherein the multimode quadrature mirror filter has a filter tap which is even in number.

6. A wavelet-based compression system for multimedia computing, the system comprising:

digitized pixels of a two-dimensional image;

a clock transmitting clock cycles;

a shift register into which two of the digitized pixels are shifted per two clock cycles;

a multimode filter, with a high-pass mode and a low-pass mode, into which the digitized pixels contained in the shift register are transferred each clock cycle; and a mode input which toggles a multimode filter between the high-pass mode and the low-pass mode once per clock cycle.

7. The system of claim 6, wherein the multimode filter has a filter tap which is even in number.

8. The system of claim 7, wherein the multimode filter comprises a multimode quadrature mirror filter and switching the multimode quadrature mirror filter comprises reversing the order of the filter coefficients and multiplying every other filter coefficient by a value of negative one.

* * * * *